July 29, 1941. C. K. ERNST 2,250,475
TRUCK OR TRANSPORTING DEVICE
Filed Sept. 6, 1938 2 Sheets-Sheet 2
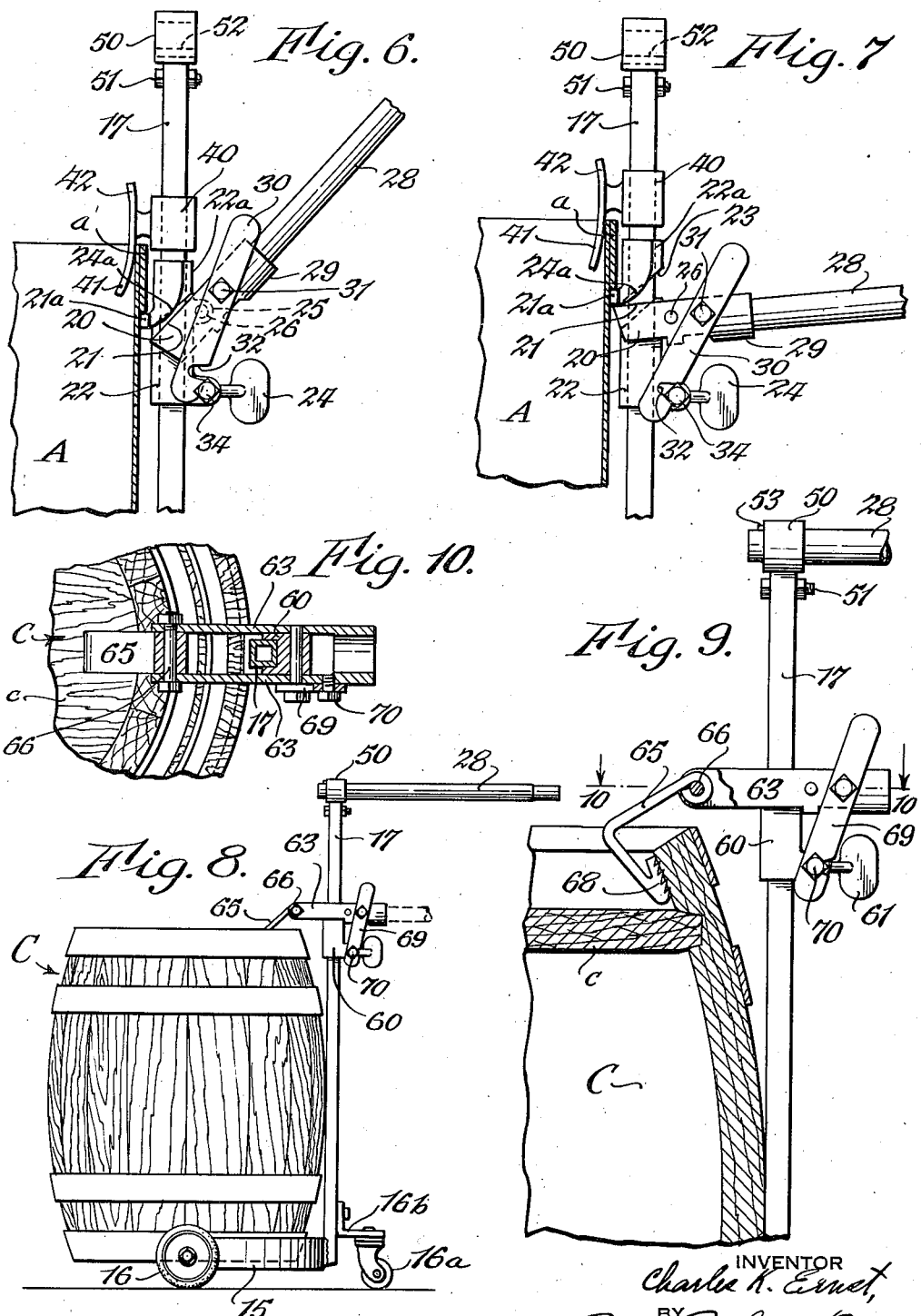

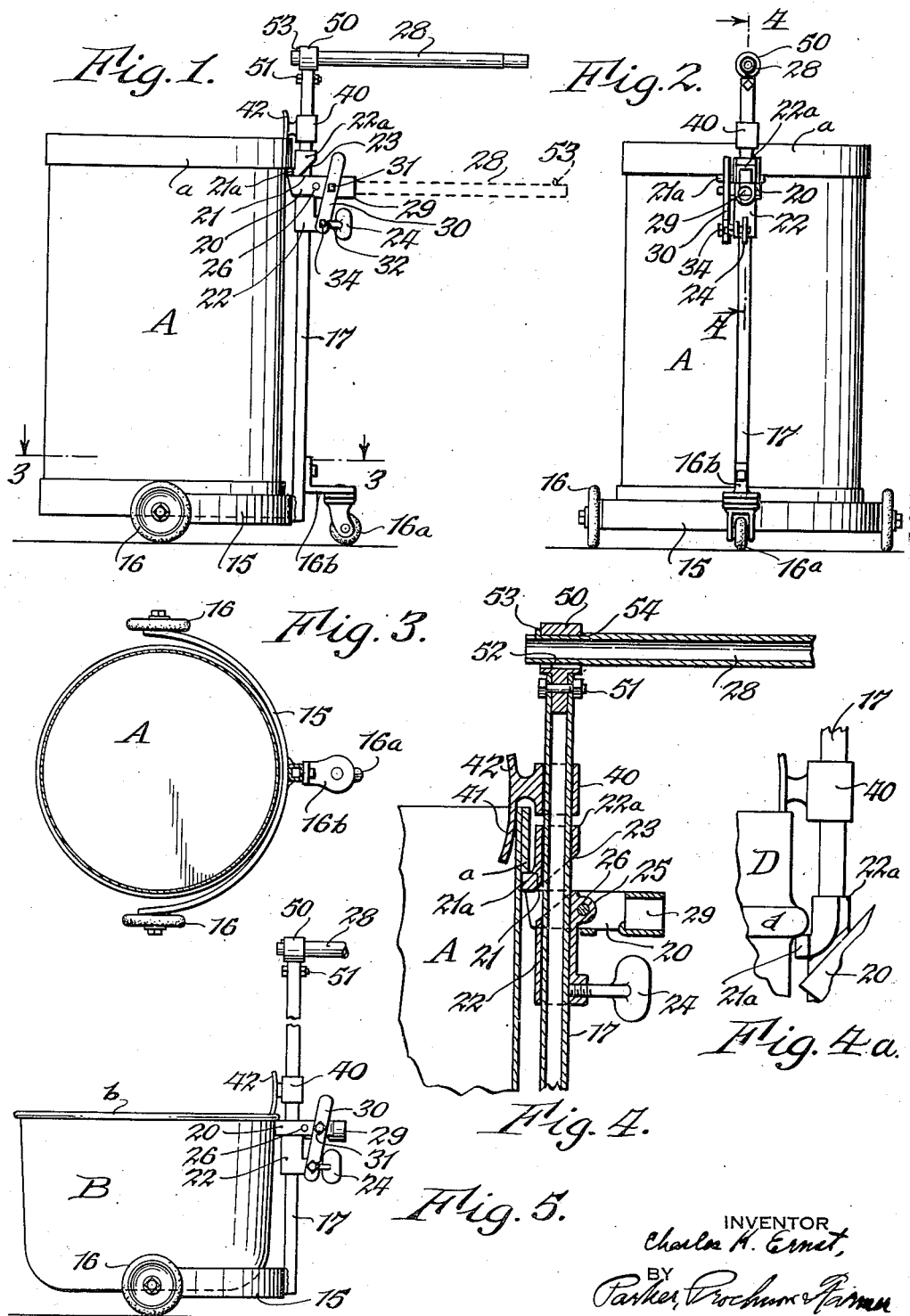

Patented July 29, 1941

2,250,475

UNITED STATES PATENT OFFICE 2,250,475

TRUCK OR TRANSPORTING DEVICE

Charles K. Ernst, Buffalo, N. Y.; Charles F. Ernst, Mae C. Lay, and Arthur G. Ernst, executors of said Charles K. Ernst, deceased Application September 6, 1938, Serial No. 228,560

19 Claims. (Cl. 214—65.4)

This invention relates to improvements in trucks or transporting devices and particularly to devices of this kind intended for transporting containers such as barrels, drums, cans, and the like.

One of the objects of this invention is to provide an improved truck or transporting device with improved means for positioning a container thereon. Another object is to provide a device of this kind with improved and easily operable raising means whereby the container can be raised from the ground or other surface for supporting it on the truck. A further object is to provide a transporting device which eliminates the necessity of tilting the container in such a manner that a portion of the truck can be inserted under the bottom of the container.

Another object of this invention is to provide a truck of this kind which can be readily adapted for raising and transporting containers of different sizes and shapes. Still another object of the invention is to provide a truck, which, when the container has been raised to the desired extent, automatically and releasably locks the raising device so that the container is firmly held in raised position relatively to the truck. Another object is to provide a device of this kind with a lever arm for use in raising and lowering the container on the transport device, and which can also be used for facilitating the guiding and moving of the truck.

Other objects of the invention will appear from the following description and claims.

In the accompanying drawings:

Fig. 1 is a side elevation of my improved truck or transporting device showing a container in raised and transporting position thereon.

Fig. 2 is a rear view thereof.

Fig. 3 is a sectional plan view thereof, on line 3—3, Fig. 1.

Fig. 4 is a sectional elevation thereof, on line 4—4, Fig. 2, on an enlarged scale.

Fig. 4a is a fragmentary side elevation showing a portion of the device in inoperative, transporting relation to a different type of container.

Fig. 5 is a view similar to Fig. 1 showing a transporting device of modified form supporting a container of still another type.

Fig. 6 is a fragmentary side view of the upper portion of the truck and of a container showing the parts in the position in which the container is about to be lifted.

Fig. 7 is a similar view of the same parts as in Fig. 6, showing the same in the position which they occupy when the lifting of the container is approximately complete.

Fig. 8 is a side elevation of a truck or transporting device of modified construction adapted for use in connection with transporting kegs or barrels.

Fig. 9 is a fragmentary view, on an enlarged scale, of the upper portion of the truck shown in Fig. 8, and showing the container in section.

Fig. 10 is a sectional plan view thereof, on line 10—10, Fig. 9.

The truck or transporting device embodying this invention includes a base 15 which may be of any suitable or desired construction and on which wheels 16 are mounted. The base may be of any form best adapted for the containers to be transported, the base shown being of substantially semi-circular form and having the wheels 16 pivotally secured to the ends thereof in such a manner that the base may extend approximately halfway around the lower portion of the receptacle to be transported and so that the wheels 16 will be arranged at approximately diametrically opposite sides of the lower portion of the receptacle. Any other arrangement of wheels may, however, be employed, if desired.

17 represents a standard or upright member which is rigidly secured at its lower portion to the base 15 in any suitable manner, such for example as by welding. This standard, in the construction shown, is of approximately square cross section, as shown in Fig. 3, but a standard of any other suitable form may, of course, be employed. The standard is preferably located approximately halfway between the wheels 16 and extends above the upper edge of the receptacle to be transported and is so arranged on the truck that it may be positioned in close proximity to the container to be transported.

While, under many circumstances, the provision of the two wheels 16 only, at the sides of the device, may serve all the requirements of supporting and transporting the truck, or the truck and its load in its movements from place to place, and during loading and unloading, I may provide an additional wheel at the back of the device. In Figs. 1 to 3 and 8, for example, I show a caster wheel 16a swivelled upon a bracket or projection 16b secured to and extending rearwardly from the lower end of the standard 17, near the base 15.

In accordance with my invention, I provide means on the standard 17 for raising the container or receptacle to a sufficient extent relatively to the truck to permit the container to be readily transported. These means are so arranged on the standard as to engage a portion of the container above the bottom thereof. If the container has a flange, bead or hoop on the upper portion thereof, such for example as the hoop or reinforcing ring a of an ash can or barrel A, as shown in Figs. 1 and 2, or a bead b of a metal basket B of the type shown in Fig. 5, the raising means may be formed to engage the lower edge or shoulder of such bead, ring, band or hoop, while if the container has an intermediate bead or annular projection, such as may be found on some kinds of metal drums, then the raising means may be arranged to engage such bead d of a drum D, as shown in Fig. 4a.

The raising means may be of any suitable or desired construction such as to make it possible to raise the container by use of a relatively small force. In the particular embodiment of this invention shown in the drawings, I provide a lever 20, one end of which may be formed either to directly engage a part of the container or to actuate a separate container engaging part. The lever shown in Figs. 1 to 4a, 6 and 7 is provided with a portion 21 adapted to engage the lower face or shoulder of a transverse abutment 21a of a sleeve 22a slidable on the standard 17 and engageable with a hoop, band or bead on the upper or intermediate portion of the receptacle. This lever may be pivoted directly on the standard 17 but preferably the lever is pivoted on an adjustable sleeve or bracket 22 which may be secured in the desired elevation on the standard 17 by any suitable means, such for example as a thumb screw 24 or other suitable securing means. This sleeve or bracket has a rearwardly extending lug 25 and a pivot pin 26 extends through this lug and through the lever 20, thus forming a fulcrum about which the lever may swing. As shown in the drawings, the portion 21 of the lever is bifurcated so as to straddle or extend past opposite sides of the standard 17. Both ends of the bifurcated part 21 of the lever are, consequently, shaped to engage the abutment 21a for lifting the container. The opposite end of the lever is preferably formed to receive an extension or handle portion which may, for example, be in the form of a metal tube or pipe 28 adapted to fit into a socket 29 formed on the lever 20. When this handle or pipe 28 is in position on the lever 20, it will be noted that a relatively short arm of the lever engages the abutment 21a while the long arm of the same may be pressed downwardly by the operator, so that the elevating or raising of the receptacle can be effected by exerting a relatively small downward force upon the outer end of the handle or pipe 28, and in this manner a heavy receptacle can be easily raised a short distance above the floor or support on which it rests. By means of the adjustable sleeve 22, it will be noted that the device can be readily adapted for use on receptacles of various sizes, the sleeve being lowered in Fig. 5 for use in connection with a relatively low receptacle and being in elevated position in Figs. 1, 2 and 4 to operate upon a higher receptacle.

For providing efficient actuation of the abutment 21a by the lever 20 in the achievement of the desired smooth and easy operation of the parts, the sleeve 22a is preferably formed to loosely engage about the standard 17, and is provided with lower inclined edges 23 which, by gravity, normally rest upon correspondingly inclined faces 23a at the upper end of the sleeve 22. Cam faces 24a on the sleeve 22a are provided over which the bifurcated part 21 of the lever 20 rolls in its movements about its pivot 26 in raising and lowering the sleeve 22a and its abutment 21a and the container. These cam faces merge into the lower face of the transverse abutment 21a so that as the lever is swung from its position in Fig. 6, through the position in Fig. 7 to that shown in Figs. 1, 4 and 5, for example, easy and smooth operation of the lever in lifting the container, is assured.

The abutment 21a could, however, be constructed and movably supported on the standard, in any other suitable way. Under some conditions, it may be desirable to entirely omit the abutment and its sleeve, and arrange the lifting means so that the extremity of the bifurcated part 21 of the lever 20 can directly engage the bead, rim or projection of the container, as shown for example in Fig. 5.

It is desirable to provide means for releasably holding the receptacle in raised position. Any suitable or desired means may be employed for this purpose. In the particular construction shown, the holding device is in the form of a detent link or latch 30 pivoted at 31 on the lever 20. The lower end of the link 30 is provided with a notch or recess 32 which is adapted to move into engagement with a holding pin or projection 34 arranged in fixed relation to the upright standard 17, for example, on the adjustable sleeve 22. In the operation of the raising device, it will be obvious that, by reference to Figs. 6 and 7, the slot or recess 32 is so located relatively to the fixed pin 34 that when the lever has been swung about its pivot to raise the receptacle, the detent link 30 will swing by gravity on its pivot 31 in such a manner that the recess 32 engages the pin 34 as shown in Fig. 1. Consequently, when the latch or detent link 30 is in this position, the lever 20 will be held against swinging in a direction to lower the receptacle or container.

In order to render the raising device fully operative at all times, it is frequently necessary to provide means for holding the container against movement away from the standard 17, this being particularly necessary in case the bead or hoop engaged by the raising means is of such shape or form that the abutment 21a or the lever 20, as the case may be, cannot securely grip the shoulder of the container. Any suitable means may be employed for this purpose, and in the particular construction illustrated, I provide a freely slidable sleeve 40 on the standard 17 above the lever 20. This sleeve 40 may be provided with a suitable hook or lip 41 secured to the sleeve and arranged in spaced relation to the standard 17 so that an end of the lip or hook may engage over the upper, inner edge of the container, and thus hold the container against movement from the standard 17. This in turn holds the receptable in position to prevent the part 21a, or the lever 20, from slipping out of engagement with the lower shoulder or edge of the band a, bead b, or the like. In the construction shown, the lip 41 flares outwardly and consequently, is capable of use with a variety of different types of receptacles, having upper edges of varying thickness. As shown in the drawing another hook or lip 42 is provided on the holding sleeve 40 and this hook or lip may be of different form from the lip 41 so that in cases where the lip 41 does not operate well in connection with a receptacle, the sleeve 40 may be removed from the standard and replaced thereon in inverted position so that the lip 42 will be in a position to engage the upper edge of a receptacle. Since this sleeve is freely slidable upon the standard 17, it will be obvious that the sleeve together with the holding lip may be moved downwardly into engagement with a receptacle before the lever 20 is actuated to raise the receptacle. During the raising of the receptacle by the lever, the sleeve 40 may slide upwardly on the standard with the receptacle which is being raised.

In order to facilitate the moving of the truck with the receptacle in place thereon without interfering with the lever 20, means are preferably provided at the upper end of the standard 17 or in any other suitable location thereon for providing a handle for moving and steering the truck. In the construction shown for this purpose, I have provided at the upper end of the standard 17 a socket 50 having a suitable stem or shank which extends into the upper end of the standard 17 and is removably secured thereto by a bolt 51 or other suitable means. The socket is preferably made of such size that one end of the handle or pipe 28 may be inserted into the socket to serve as a tongue or handle for steering and propelling the truck. In order to form a secure connection between the socket and the handle or pipe 28, the socket may be provided with a keyway 52, see particularly Fig. 4, and one end of the handle or pipe 28 may be provided with a suitable pin or projection 53 of such size and proportions as to readily move through the keyway from one end to the other thereof. When this projection 53 has been passed through the keyway, the handle or pipe 28 may be turned so that the pin or projection 53 is out of alinement with the keyway. Preferably the lever or handle 28 is also provided with a reduced end portion fitting through the socket 50, thus forming a shoulder 54 which limits the extent to which the handle or pipe 28 may be inserted into the socket. Consequently, when the parts are in the position shown in Figs. 1 and 4, the handle or pipe 28 is held against movement lengthwise in either direction in the socket 50 so that the handle or pipe forms a rigid tongue or extension, whereby the truck may be propelled and guided by the operator. In the construction shown, I have illustrated the handle or pipe 28 so that one end is formed to engage with the socket 50 for propelling and guiding the truck while the other end may be inserted into the socket 29 of the lever 20 to act as an extension of one of the arms of this lever, to facilitate the raising of the receptacle.

In the operation of the device described, when the same is used, for example, to transport an ash can or barrel A, as shown in Figs. 1 to 4, 6 and 7, the sleeve 20 is first adjusted to the desired height. The truck is then moved into operative relation to the can A in such a manner that the wheels 16 extend at approximately diametrically opposite sides of the lower portion of the can or receptacle and the lever 20 is positioned to engage the lifting means with the lower edge of the hoop or band a. The slidable sleeve 40 is then permitted to drop into a position to engage the upper edge of the container A. The operator then inserts the handle or pipe 28 into the socket 29 of the lever 20 and swings the lever downwardly from the inclined position shown in Fig. 6. The part 21 of the lever, consequently, moves upwardly and raises the receptacle A sufficiently to elevate the same to a slight extent above the floor or other support. During this swinging of the lever 20, in cases where the caster wheel 16a is omitted, see Fig. 5, the truck and container may be first swung into an inclined position, not shown in the drawings, in which the portion of the base 15 adjacent to the lower end of the standard 17 rests on the ground or floor, whereupon the force exerted upon the outer end of the handle 28 easily raises the receptacle. After the outer end of the handle 28 has been swung downwardly to a sufficient extent to raise the receptacle A, the link or latch 30 moves into holding engagement to the pin 34, thus holding the lever against swinging in the opposite direction. Fig. 7 shows the position of the parts when the latch is about to swing by gravity into locking position. The handle or pipe 28 is then removed from the socket 29 while the truck rests in inclined position with the portion of the base adjacent to the standard 17 resting on the ground and the pipe or handle 28 is connected with the socket 50 as has been described, so that the truck can be moved into transport position, as shown in Figs. 1 and 2, whereupon the truck may readily be pushed or pulled into any desired location. In order to again position the receptacle on the ground or floor, the handle or pipe 28 is again inserted into the socket 29 and upon a slight downward movement of the outer end of the handle 28 the latch or link 30 may be moved out of engagement with its holding pin 34, whereupon the handle 28 of the lever may be permitted to swing upwardly, thus lowering the receptacle to the ground. To facilitate this operation, the latch or link 30 is provided with an upwardly extending portion, whereby the same can be readily manipulated by the operator.

It will be noted that when the container is in raised position on the truck, and when the truck is in the position shown in Figs. 1 and 2, the axis of the wheels 16 is substantially below the center of gravity of the container, and consequently, these wheels support substantially the entire weight of the container, so that the only effort necessary to transport the container is to move and guide the same. Since the container is raised only to a slight extent above the floor or supporting surface, when the operator releases the handle or tongue, the truck tilts about the axis of the wheels only to a slight extent in either direction, until either the rear edge of the container or the front edge of the base 15 rests upon the ground. Because of this small amount of tilting, very little effort is required to tilt the truck back into transport position.

While the foregoing statement of operation refers particularly to trucks in which caster wheels 16a are omitted, it will be obvious that the same manipulation of the raising lever will likewise effect the raising and lowering of a container, when the truck is provided with a third wheel or caster, as described. The use of the caster wheel 16a adds to the safety of the truck when used on heavy containers, since the danger of tipping over the truck and container is very remote, while the truck can be easily propelled and guided while tilted and supported on the caster wheel only, when unloaded.

When the device is employed in connection with a receptable B, such as shown in Fig. 5, the same manner of operation is followed, except that the sleeve 22 supporting the lever 20 is first secured on the standard 17 in a lower position to engage the beaded edge b of this receptacle.

In Figs. 8 to 10, I have shown a slightly modified form of my improved truck or transporting device, whereby the same may be employed in connection with the transporting and moving of barrels, or similar articles. For such use the base 15, standard 17 and other parts of the truck are the same as described in connection with the other figures but the elevating lever is of different construction and the holding sleeve 40 and the parts connected therewith are omitted. As shown in Figs. 8 to 10, an adjustable sleeve or bracket 60 is provided on the standard 17. This sleeve may be secured on the standard in adjusted position in any suitable manner, for example, by means of a set screw 61 similar to the set screw 23. A lever 63 is pivoted on the sleeve 60 in the same manner as the lever 29 and also has a socket for engagement with the handle or pipe 28. The lever 63 has a gripping claw or hook member 65 pivoted at 66 to one end of the lever 63 and this hook member. Since the container lifting end of the lever 63 is bifurcated, the hook member 65 is conveniently pivoted between the two parts of this end of the lever, as shown in Figs. 9 and 10. As clearly shown in Fig. 9, this claw or hook member is of angular shape and provided at the free end thereof with a roughened, grooved or notched surface 68 which is adapted to engage the inner surface of one or more of the staves of the barrel C above the head c thereof. When the claw 65 is in such engaging position, the lever 63 is swung about its pivot, thus raising the barrel in the same manner as described in connection with Figs. 1 to 7 and when the barrel is in raised position, a link or latch 69 engages a holding pin 70 so that the barrel is held in elevated position, whereupon the same may be transported by removing the pipe or handle 28 out of the socket of the lever 63 and inserting the same into the socket 50 at the upper end of the standard 17.

The construction illustrated in Figs. 8 to 10 inclusive may be employed in connection with any containers having projecting means on their inner upper edge portions with which a claw somewhat similar to the claw 65 may engage, and in such cases, no means for holding the container in correct relation to the standard 17 is necessary, since a claw or hook such as shown in Figs. 8 to 10 urges the container toward the standard 17 during the raising of the container.

During the raising of the container in the constructions illustrated, the container tends to swing by gravity into contact with the base 15 or standard 17, and the base 15 also acts to hold the container in correct relation to the standard and raising mechanism.

Trucks made in accordance with this invention have the advantage that they very greatly facilitate the transporting of heavy receptacles, in that the raising of the receptacle is effected entirely by means of a lever which is so formed that a relatively small force is sufficient to raise a heavy receptacle sufficiently to enable the same to be transported on a truck. Furthermore, during transportation, the receptacle remains in substantially upright position so that there is very little risk of spilling the contents. Furthermore, the truck has the advantage that it can operate successfully in case of barrels or containers standing close to or in contact with a wall or other object. With the ordinary truck commonly used it is necessary for the operator to first tilt the container away from the truck so that a portion of the truck may be inserted underneath the bottom of the container. If the container stands in a position where such tilting away from the truck is not possible, then the operator must bodily move the container into another position, whereas with the truck herein described, the containers can be elevated when located in very confined positions.

The device shown in the drawings is, of course, merely illustrative of several embodiments of this invention and it is understood that it is not intended to limit the scope of this invention to the particular embodiments shown.

I claim as my invention:

1. In a device for transporting containers, the combination of a base having wheels mounted thereon, a standard fixed to and extending upwardly from said base and adapted to be moved into proximity to a container, an adjustable sleeve mounted to slide on said standard, means for locking said sleeve in adjusted position on said standard, a lever pivoted on said sleeve and having an end portion adapted to engage a part of the container above said base for raising the same bodily lengthwise of said standard, and a swinging latch which automatically locks said lever and said sleeve together for holding said lever in the position to which it moves when the container is raised.

2. In a truck for transporting containers, the combination of a base having wheels mounted thereon, a standard extending upwardly from said base and adapted to be positioned in proximity to a container, a lever mounted on said standard, a part arranged to engage a part of the upper portion of a container upon swinging said lever for raising the container lengthwise of said standard, said lever having a socket formed therein, a handle adapted to extend into said socket to form a long arm for said lever, and another socket arranged in fixed relation to said standard and into which said handle may be inserted for moving and guiding said truck.

3. In a device for transporting containers, the combination of a base of substantially semi-circular form and adapted to extend partly around a container, wheels mounted on the ends of said base and arranged to be positioned at approximately diametrically opposite sides of the lower portion of said container, a standard extending upwardly from said base midway between said wheels, means on said standard for engaging the receptacle above said base for raising said receptacle, a caster swivelled on said base at the lower end of said standard, and means on said standard for propelling and guiding said device in an upright position on said wheels and said caster, and for facilitating tilting said device so that the same may be supported and propelled on said caster alone.

4. In a device for transporting containers, the combination of a base having wheels mounted thereon, a standard secured to and extending upwardly from said base, a sleeve freely slidable on said standard for movement lengthwise thereof, an abutment on said sleeve engageable with a part of said container, a second slidable sleeve on said standard, a lever pivoted thereon and movable into position to raise said first sleeve and press said abutment against said container part for raising said container, means for locking said lever in holding position, and means for adjustably holding said second sleeve in different positions on said standard in accordance with the height of the part of said container which is engaged by said abutment.

5. In a device for transporting containers, the combination of a base having wheels mounted thereon, a standard secured to and extending upwardly from said base, a sleeve freely slidable on said standard for movement lengthwise thereof, an abutment on said sleeve engageable with a part of said container, a second slidable sleeve on said standard, a lever pivoted thereon and movable into position to raise said first sleeve and press said abutment against said container part for raising said container, means for locking said lever in holding position, means for adjustably holding said second sleeve in different positions on said standard in accordance with the height of the part of said container which is engaged by said abutment, and a third sleeve slidable on said standard and having a part engageable with another portion of the container for holding the container in proximity to said standard.

6. A device for transporting a container having a substantially upright wall, said device including a base having at least three wheels for supporting said base in stable equilibrium upon a floor, said base having a part with a horizontally opening recess arranged to extend at least approximately half-way around the lower part of a container to be transported and having wheels arranged on said part adjacent the ends of said recess so as to be positioned at approximately diametrically opposite sides of said container, an upright standard secured to said base close to the face wall of said recess between said last mentioned wheels in a position to extend into close proximity to the container, another of said wheels being disposed behind said recess and all wheels supporting said base for rolling while said standard is upright, means on said standard while said standard is upright for engaging a portion of the upright container wall at a single zone only and which is adjacent to said standard and operable for elevating said container relatively to said base while all of said wheels rollingly support said base, and means on the unit formed of said base and standard for holding the container against tilting when said container is elevated relatively to said standard and base, said last mentioned means being adjustable on said standard independently of said first mentioned means.

7. A truck for transporting a container having a base and an upright peripheral wall, said truck having a base mounted on wheels and having a portion thereof horizontally recessed from one side and formed so that it may be moved into a position to extend at least half-way around the container base to be transported and so that two wheels of said truck can be advanced at least to positions in which they are at diametrically opposite sides of said container base, an upright standard rigidly secured to said truck base approximately midway between said two wheels and in a position to extend in close proximity to the upright wall of said container when said container is so received by said base, means on said truck for confining the movement of a container in a substantially vertical direction, and means adjustably secured on said standard for engaging a portion of said upright wall of said container above the bottom thereof to impart a slight movement thereto in a substantially vertical direction relatively to said truck and while said wheels constitute a rolling support for said base, whereby said container may be positioned on said truck and entirely supported thereby at a slight elevation above a floor and without material change in the angular relation of said container relatively to the floor.

8. An improved device for transporting a rigid container having an upright peripheral wall, which comprises a base having roller supports at at least three spaced, non-alined points and having an upright standard rigidly secured on said base, said base being formed to embrace said container horizontally while said container is resting on a floor, with an upright peripheral wall of said container arranged closely adjacent to said standard and with a vertical line through the center of gravity of said embraced container passing within the horizontal area defined by straight lines joining said points of support of said base, and mechanical lift means carried by said device and engageable with and operable solely on a single small zone of the upright peripheral wall of the container, even while said container is resting on the floor, to lift and support said container by its said upright wall in upright, substantially untipped position and while said base remains rollingly supported, whereby when said container is so lifted, said truck may be rolled to a different location.

9. An improved device for transporting a rigid container having an upright peripheral wall, which comprises a base having roller supports at at least three spaced, non-alined points and having a single upright standard rigidly secured on said base, said base being formed to embrace said container while said container is resting on a floor, with an upright peripheral wall of said container arranged adjacent to said standard and with a vertical line through the center of gravity of said embraced container passing within the horizontal area defined by straight lines joining said points of support of said base, means carried by said standard and engageable with an embraced container for confining that container against horizontal movement away from said standard, and mechanical lift means also carried by said standard and engageable with and operable solely on the upright peripheral wall of the container while said base remains rollingly supported, even while said container is resting on the floor, to lift and support said container in upright position by its said upright wall, whereby when said container is so lifted, said truck may be rolled to a different location with said container in upright, untipped position.

10. An improved device for transporting a rigid container which has a laterally extending shoulder along and bordering its peripheral, upright wall, comprising a base having an upright standard and having arms spaced apart horizontally and extending forwardly from said standard to receive between them said container with said upright wall of said container in immediate proximity to said standard and with the vertical central axis of said container within the portion received between said arms, means rollingly supporting the forward ends of said arms and the rear of said base, means for confining said container, so received, against horizontal movement away from said standard, and power amplifying lift means carried by said standard and engageable with said upright wall of said container solely beneath said shoulder while said container is resting on a floor for lifting said received container and holding it lifted while the device and container are rolled to a new location.

11. A device for transporting a container having a substantially upright wall with a downwardly facing abutment, said device including a base having wheels for supporting said base from a floor, said base having a part arranged to extend approximately half-way around the lower part of a container and having wheels arranged on said part so as to be positioned at approximately diametrically opposite sides of said container, an upright standard secured to said base between but spaced materially away from said last mentioned wheels and in close proximity to any container partially embraced by said base part and forming a unit with said base, means on said standard for engaging beneath said abutment of the container wall at a single zone adjacent to said standard for elevating said container relatively to said base, while said base remains rollingly supported by said base and said standard is upright, said unit having a part for holding the container against tilting from upright position when said container is elevated relatively to said standard and base, and releasable means for holding said elevating means in position in which said container is raised from a floor.

12. In a truck for transporting containers having substantially upright outer walls, the combination of a base having at least three wheels mounted thereon, a standard extending upwardly from said base and rigidly secured thereto, said base having a part arranged to embrace a container and having two wheels located thereon positioned at opposite sides of said container, whereby the entire weight of said container when raised vertically will be supported by all of said three wheels, a lever pivoted on said standard and having a short arm adapted to exert an upwardly directed force on a portion of the upright wall of a container and having a long arm which may be depressed by an operator, means on said standard for holding said container against movement in a direction away from said standard while said container is being raised by said lever, and means for releasably locking said lever in the position in which the container is raised.

13. In a truck for transporting containers having substantially upright outer walls, the combination of a base having at least three wheels mounted thereon, a standard extending upwardly from said base and rigidly secured thereto, said base having a part arranged to embrace a container and having two wheels located thereon positioned at opposite sides of said container, whereby the entire weight of said container when raised vertically will be supported by all of said three wheels, a lever pivoted on said standard and having a short arm adapted to exert an upwardly directed force on a portion of the upright wall of a container and having a long arm which may be depressed by an operator, means on said standard for holding said container against movement in a direction away from said standard while said container is being raised by said lever, means for releasably locking said lever in the position in which the container is raised, and means for adjusting the pivot of said lever lengthwise of said standard to enable the truck to operate on containers of different kinds.

14. In a truck for transporting containers having substantially upright outer walls, the combination of a base having at least three wheels mounted thereon, a standard extending upwardly from said base and rigidly secured thereto, said base having a part arranged to embrace a container and having two wheels located thereon positioned at opposite sides of said container, whereby the entire weight of said container when raised vertically will be supported by all of said three wheels, a bracket adjustable vertically on said standard, a lever pivoted on said bracket and having a short arm adapted to exert an upwardly directed force on a container for elevating the same and having a long arm adapted to be actuated by an operator, means also mounted on said standard for engaging the container to hold the same against movement away from said standard, whereby the container is lifted vertically into transport position on said three wheels.

15. In a truck for supporting containers having an upright, rigid side wall with a downwardly exposed abutment surface, above the bottom thereof, said truck having at least three wheels and including a base having a horizontal recess with side portions adapted to extend to opposite sides of the container and substantially restrict sidewise movement of said container in said recess and having a wheel arranged on each of said portions, a standard extending in a substantially upright direction from said base and adjacent said recess so as to be positioned adjacent to the upright side wall of said container received in said recess, lifting means on said standard, engageable beneath said surface, and operable for exerting an upwardly directed force on the side wall to raise the container off a floor and hold it lifted while the weight of said container is carried by said three wheels through said standard and base, and a hook member also movable vertically relatively to said lifting means and engageable downwardly over the top of said wall and against the inside face of said wall for confining the container against movement away from said standard while it is being lifted and held lifted, whereby the container may be raised from a floor and transported in upright position and without tilting said truck and said container.

16. In a truck for supporting containers having upright side walls, said truck having at least three wheels and including a base having portions adapted to extend to opposite sides of the container and having a wheel arranged on each of said portions, a standard extending in a substantially upright direction from said base and adapted to be positioned adjacent to the upright side wall of said container, a member slidable vertically on said standard and adapted to engage a part of said container, a lever pivotably mounted on said standard and having a short arm adapted to engage said member for moving the same vertically to raise said container to support the same on said three wheels, and means slidably mounted on said standard for movement independent of said slidable member and for engaging the container for confining the same against movement away from said standard, whereby the container is raised from a floor and transported without tilting said truck and said container.

17. In a truck for supporting containers having upright side walls, said truck having at least three wheels and including a base having portions adapted to extend to opposite sides of the container and having a wheel arranged on each of said portions, a standard extending in a substantially upright direction from said base and adapted to be positioned adjacent to the upright side wall of said container, a member slidable vertically on said standard and adapted to engage a part of said container, a lever pivotally mounted on said standard and having a short arm adapted to engage said member for moving the same vertically to raise said container to support the same on said three wheels, means movably arranged on said standard for engaging the container for confining the same against movement away from said standard, whereby the container is raised from a floor and transported without tilting said truck and said container, and latch means for releasably holding said lever in its container elevating position.

18. A device for transporting rigid containers of the type having upright peripheral walls where the walls may have downwardly facing external abutments at different heights in different containers and comprising a base having a rolling support and a horizontally opening recess in which a container to be transported may be received by rolling of said base in a direction to place said recess in partial embracing relation to said upright container wall, a rigid standard upstanding from said base at a point adjacent the deepest part of the recess and approximately bordering said recess, and means adjustable vertically on said standard into different initial starting positions and having a part operable to engage beneath said abutment on said wall of any of said different containers and through it lift said container vertically relatively to said base and hold it so lifted and having another part operable to confine said wall to said standard and against tipping while said base remains rollingly supported, whereby adjustment of said means adapts it to engage containers of different kinds and sizes.

19. A device for transporting a rigid self shape retaining container with an upright, rigid side wall, comprising a roller supported vehicle having a horizontally opening recess in which said container may be received by rolling of said vehicle in a direction to place said recess in partially embracing relation to said side wall of said container, and also having an upright standard, means mounted on said vehicle and operable on said wall of a container in said recess at a point above the bottom of said wall to lift it, and through it said container, while said vehicle remains rollingly supported and with its standard remaining upright, and means movable vertically along and connected to said standard and operable to descend vertically relatively to said lifting means over the top end of said wall adjacent said standard and engage with the inner face of said wall for confining said top end of said container to said standard, whereby a container may be embraced, lifted, held lifted and transported by rolling of said truck, while in upright position.

CHARLES K. ERNST.